United States Patent [19]

Huhn et al.

[11] 4,391,302
[45] Jul. 5, 1983

[54] COUPLED TUBULAR CASING FOR FOODSTUFFS

[75] Inventors: Helmut Huhn; Siegfried Kaiser, both of Walsrode, Fed. Rep. of Germany

[73] Assignee: Wolff Walsrode Aktiengesellschaft, Fed. Rep. of Germany

[21] Appl. No.: 114,655

[22] Filed: Jan. 23, 1980

[30] Foreign Application Priority Data

Jan. 27, 1979 [DE] Fed. Rep. of Germany ....... 2903117

[51] Int. Cl.³ .............................................. F16L 11/12
[52] U.S. Cl. .................................. 138/118.1; 138/120; 285/293; 285/370; 285/397; 285/DIG. 16
[58] Field of Search ...................... 138/118.1, 120, 155; 285/293, 370, 397, 53, 55, DIG. 16; 156/158, 187, 304.2, 304.4; 426/105, 135, 138

[56] References Cited

U.S. PATENT DOCUMENTS

| 662,618 | 11/1900 | Camp | 285/293 |
| 2,050,023 | 8/1936 | Slayler | 285/293 |
| 3,002,871 | 10/1961 | Tramm et al. | 285/397 X |

FOREIGN PATENT DOCUMENTS 1650239 12/1970 Fed. Rep. of Germany ... 285/DIG. 16

Primary Examiner—James E. Bryant, III
Attorney, Agent, or Firm—Connolly and Hutz

[57] ABSTRACT

Coupled tubular casings are obtained by placing a coupling piece, preferably a multilayered foil, on the inside of and overlapping two adjacent ends of tubular casings to be coupled and whose adjacent edges make an angle of 10° to 80° with the envisaged axis of the tubular casing, and sealing it.

11 Claims, 6 Drawing Figures

COUPLED TUBULAR CASING FOR FOODSTUFFS

This invention relates to a coupled tubular casing, a process for its manufacture, the apparatus employed and the use of the casing as packaging material.

Coupled tubular casings are known. French Patent Application No. 75 27312 (U.S. Pat. No. 4,032,176) discloses a coupled tubular casing in which, for example according to FIGS. 1 and 2 of that patent application, two tubular end pieces are placed one inside the other and the coupling thereby formed is wrapped inside a protective band of foil. Alternatively, as shown in FIGS. 3 and 4 of that application, the ends of the tubes may be brought together without inserting one inside the other and the edges of the tubes touching each other may be wrapped in an overlapping band for protection.

According to the known methods, the ends of the tubes are cut transversely to the axis of their lumina and the collars are placed transversely to produce the coupling. The use of such coupled casings shown in FIG. 13 for producing shirred gut casings are not without problems, because of the thickness and flexibility of the casings. It is certain that such couplings are difficult to use for casings made of a relatively delicate material if the casings are filled with pasty material and then passed through a so-called "gut brake" to ensure a tight fill. In these gut brakes, the filled casings are passed through a constricted but flexible lumen and gripped on their external circumference so that it is only with some delay that they can "escape" the internal pressure exerted on them from the inside by the pasty filling extruded from the filling spout. The considerable stress thereby exerted on the material of the casing causes the usual couplings to tear, thus interrupting the continuous filling process for some time. If the tubular casings are coupled at relatively short intervals, as is frequently the case for the sake of optimum utilisation of the casing material, the filling process breaks down every time a coupling point is reached.

Thus most of such coupled tubular casings, which are usually supplied to the manufacturer in shirred form must therefore generally be checked through to cut out any couplings before they are delivered. This results in considerable waste in the course of time, which often leads to an unwanted increase in cost and makes the production of tubular casings more difficult. However, this is the only method by which it has hitherto been possible to prevent the troublesome frequent stoppages in the filling operations due to beakage of the couplings, especially in the "gut brake". This qualitative statement can be substantiated by quantitative data. For manufacturing technical reasons, tubular casings are manufactured in finite lengths of from 10 to about 20 m. These can be compressed to a few tens of decimeters by shirring them. The desired length of the shirred casing which is to be processed into filled tubular casings is determined by the geometrical reqirements of the automatic filling and sealing machines which operate portionwise. Since the manufactured lengths mentioned above are not an exact multiple of the desired shirred casings, it is necessary to join the tubes by couplings which are produced by the known art methods described above. The couplings sleeves are usually adhesive bands. This frequently results in an approximately three-fold thickening of the tubular casing, thereby giving rise to the troublesome tearing during filling described above. If, for example, two lengths of finished tube each measuring 100 to 120 m are tucked to form shirred casings each containing 20 m of the original length of tubing, then about 10 shirred casings can be obtainend without couplings but one casing must have a coupling. There is therefore a statistical wastage of about 10%.

The problem therefore arises of producing a tube coupling which does not have the disadvantages mentioned above and can therefore withstand not only the forces to which it is subjected in the so-called "gut brake" but all the other stresses to which it is subsequently subjected. Even if a commercial tube coupling unexpextedly withstands the stresses in the gut brake, the coupling is still liable to be damaged at subsequent stages of operation on the filled casing, especially during the so-called "clipping process" in which a casing closed at one end is closed at its other end, a process which puts considerable strain on the casing. Other stresses to which the casing is subsequently subjected depend on the nature of the filling and include the so-called "boiling" followed by chilling and shrinkage by drying of the casing. This so-called "boiling" is carried out in water or a steam atmosphere at 80° C., sometimes for a time of not less than one hour, a process during which any damage suffered by the coupling during its passage through the gut brake is liable to cause the coupling to open up so that the portion of filled tube containing it becomes unusable.

Due to the considerable wall thickening of the tube at the couplings the casings also cause considerable deformation of the printing block when the casing is subsequently printed by the high pressure process, and this deformation takes a considerable time to recover, so that faulty sections of the casing are also produced by defective printing. This is another reason why the production of a suitably improved tubular casing would be desirable.

To solve this problem of providing a suitably coupled tubular casing according to the invention, two seamless or seamed tubular end pieces are placed end to end with their edges making an angle of 10° to 80° with the axis of the tube, and the two ends are joined together by a flat coupling piece which is placed on the inside of the tubular end pieces to overlap the edges.

The tubular coupling according to the invention thus has a coupling seam extending at an angle or obliquely to the longitudinal axis of the tube so that the thickening due to the coupling only gradually exerts an added strain on the filled tubular casing, for example during its passage through the aforesaid "gut brake". This oblique positioning of the coupling seam, which is an essential feature of the invention, is combined with another essential feature of the invention, namely that in constrast to the known coupling sleeve mentioned above, the coupling piece is not placed on the outside of the joined casing but on the inside as an overlapping flat piece. Due to the combination of these two decisive changes, even tubular casings of the type which are highly sensitive to mechanical stresses may, if they are equipped with the couplings according to the invention be passed through the so-called "gut brakes" without any damage and can subsequently withstand further stresses during boiling, chilling, drying without tearing at the couplings.

The flat coupling piece or collar placed on the inside is suitably a thin, sealable unit, preferably in the form of a multilayered foil, having its sealing layer facing the sealing layer of the end pieces which are to be joined.

The invention may be carried out on, for example, the end pieces of a tubular casing such as that described in German Auslegeschrift No. 1,302,384, which is a casing of regenerated cellulose coated with a sealing compound on the inside. This tubular casing may also be pigmented, as described in German Offenlegungsschrift No. 2,539,706. The tubular casings which are required to be coupled may also be adapted to be sealed on the outside and turned inside out according to German Pat. No. 1,479,836, so that the adhesive layer is then on the inside of the casing.

The coupling sleeve placed on the inside of the to be coupled casings may be in the form of a flat piece, preferably a multilayered foil comprising at least one supporting layer, at least one sealing layer and at least one adhesifying layer. Such multilayered foils used as coupling members may, for example, be built up in the manner described in German Offenlegungsschriften Nos. 1,905,539; 1,965,479; 2,423,423; 2,020,344 or 2,209,242. The material used for the supporting layer of the multilayered coupling sleeve according to the invention may be one of the usual known polyamides, such as 6-polyamide, 6,6-polyamide or 6–11 polyamide or other polyamide compounds such as those described, for example, in German Offenlegungsschriften Nos. 1,770,406; 1,816,509; 1,903,266 and 1,944,619. Other materials suitable for the supporting layer of the internal coupling sleeve include, for example, polyolefines such as those described in connection with adhesifying agents, in German Auslegeschrift No. 1,646,200 and German Pat. No. 2,034,257. Supporting layers of polyethylene terephthalates, polycarbonates and other substances may also be used. But it is preferred to use supporting layers of polyamides in the form of their homopolymers and copolymers. The sealing layers facing each other from the internal coupling sleeve and the external tubular casing are advantageously selected from a group of substances including, inter alia, nitrocellulose and polyethylene as described in German Auslegescrift No. 1,302,384 already mentioned above. The sealing substances are preferably homopolymers and/or copolymers, which may be mixed with other substances of polyvinylidene halides. Such polyvinylidene halides have been described, for example, in German Auslegeschrift No. 1,646,200, German Offenlegungsschrift No. 1,654,675, German Pat. No. 1,669,069, German Offenlegungsschrift No. 1,669,070, German Pat. No. 1,945,970, German Offenlegungsschrift No. 2,020,344, German Pat. No. 2,034,257, and German Offenlegungsschriften Nos. 2,423,423 and 2,725,586.

If, for any reason, it is undesirable to use a layer of sealing laquer to which an adhesifying substance has been added directly, a substance which will only adhere to a special anchoring layer situated between the sealing layer and the supporting layer may be used as sealing layer for the coupled casing. This intermediate layer, which may therefore also be known as adhesifying layer, may consist of a carboxylic acid amide-N-methylol derivative, a polyacrylic compound, a polyethylene imine condensate, a melamine formaldehyde condensate or a urea formaldehyde condensate. Such adhesifying substances suitable for the purpose of the present invention have been described both as components of so-called "one-coat" lacquers and as components of so-called "two-coat" lacquer, inter alia in German Auslegescrift No. 1,302,384, German Offenlegungsscriften Nos. 1,471,730 and 1,594,317, German Auslegescrift No. 1,646,200, German Offenlegungsschrift No. 1,669,069, German Pat. No. 1,669,070, and German Offenlegungsschriften Nos. 2,020,344; 2,209,242; 2,423,423 and 2,725,586.

According to a special embodiment of the invention, the coupling foil placed inside the still flat and empty coupled casing is a so-called "double multilayered foil" having two internally situated supporting layers joined together by a soluble adhesive, e.g. a commercial paraffin oil, and, placed on these layers and facing away from each other, externally situated sealing layers. Although the advantages of a coupling foil having this structure are related to the requirements of the process and will therefore only be dealt with later in this description, it may be said now that the tendency of these multilayered foils to roll up is greatly reduced or even eliminated by their arrangement as double multilayered foils.

Although the invention may in principle be carried out with coupled casings in which the contiguous edges of the end pieces make an angle of 10° to 80° with the envisaged axis of the tubular casings, an angle of 30° to 60° and particularly an angle of 40° to 50°, more particularly 45° is preferred for the purpose of the invention. The coupling piece is advantageously in the form of a parallelogram or approximately so, with the angles at the corners of the parallelogram being equal to or the supplement of the angle between the edges of the end pieces and the envisaged axis of the tube. When such geometrical forms are observed, the edges of the internal coupling sleeve are in alignment with the edges of the coupled end pieces of the casing so that a relatively narrow coupling sleeve may be used, depending on the stability of the material of the sleeve, so that a saving in cost can be achieved.

Due to the face that the sealing layers of the tubular casings which are to be joined together and of the coupling sleeve face each other, the coupled casing according to the invention is distinguished by the great bond strength of the coupling and consequent durability, so that the subject of the invention, as already explained above, is particularly suitable for the subsequent treatment of such casings in the filling and finishing processes. Even severe mechanical or prolonged thermal treatments can be much better withstood by a casing which has been coupled according to the invention than the known coupled tubular casings.

The inventive coupling of the tubular casing is preferably carried out as follows: A multilayered foil capable of being sealed is first formed from 1. a supporting layer of polymer foil which may be pretreated by a corona discharge treatment, 2. a layer of conventional adhesifying substance applied to layer 1, and 3. a top coat capable of being sealed applied to layer 2, optionally from a dispersion or solution. This multilayered foil may either be used in this form in which it can only be sealed on one side or the exposed surface of the supporting foil may be coated with a conventional soluble adhesive, for example a paraffin oil, and two such foils may be placed together with their adhesive supporting layers in contact to form a so-called "Duplofoil" which can be sealed on both sides. The multilayered foil capable of being sealed on either one or both sides is then cut up into individual pieces of suitable width to be used as coupling foils. The two tubular end pieces of the casing which are to be joined together, which are capable of being sealed on the inside and have their edges cut to lie in parallel planes, are then pushed one over each end of the coupling foil until their edges meet. The end pieces are then sealed to the piece of coupling foil on their inside, if necessary with the application of pressure and/or heat. The surface seal thereby produced on both sides of the coupling edge, which extends obliquely over the tubular ends which are to be coupled, joins the three components to form a single coupled tubular casing according to the invention.

If the coupling piece can be sealed on only one side, its length must be equal to the whole internal circumference of the tubes which are to be joined together. If a so-called "double foil" described above is used as coupling member, its length need be only half the internal circumference of the tubular end pieces of the casing.

Such a double foil inserted as an internal sleeve has the advantage of being smaller as well as being more easily inserted into the end pieces and it easily separates into its two components when the tubular casing round it is inflated by the subsequent processes. As already mentioned above in the description of the product according to the invention, the supporting layer of the coupling foil should be made of polymer substances selected from, inter alia 6,6-polyamide, polycarprolactam, 11-polyamide, 12-polyamide, polyethylene terephthalate, polypropylene and regenerated cellulose with or without fibre reinforcement.

The component of coupling foil used as sealing layer is preferably made of a polymer substance selected from polyvinylidene chloride, polyvinylidene fluoride and their copolymers, nitrocellulose and polyethylene. The additional adhesifying layer which may be provided in the coupling foil is preferably a carboxylic acid amide-N-methylol deivative, polyacrylic compound, polyethyleneimine condensate, melamine formaldehyde condensate or urea formaldehyde condensate.

The following is a particularly advantageous method of carrying out the process according to the invention for producing the multilayered sealing foil used as pieces of coupling foil: The component which is to form the adhesifying layer is used in a quantity of 0.2 to 5 g, surface weight per m$^2$ of supporting foil, and the component which is to form the sealing layer is used in a quantity of 5 to 50 g, surface weight per m$^2$ of supporting foil, and the two components are applied to the support one after the other by a conventional method and solidified by drying on the support to form a firmly adhering lacquer coat which is capable of sealing. In order to obtain the correct oblique angle of the foil coupling, the ends of the tubular casings are cut so that their edges are parallel to each other and to the pieces of coupling foil and make an angle of 10° to 80°, preferably 30° to 60°, particularly 40° to 50° and most preferably 45° with the envisaged axis of the tube before the piece of coupling foil is placed on the inside of the two pieces which are to be joined together.

Highly resistant tube couplings are obtained if after the two tubular end pieces have been placed over the piece of coupling foil, the three components are sealed together at a sealing temperature of 110° to 200° C. and a sealing pressure of 1.5 to 6 excess atmospheres for 8 to 1 seconds to form a sealing surface having a width of 10 to 80 mm. A firmly coupled tubular casing is thereby obtained. Sealing temperatures of 150° to 190° C., sealing pressures of 3 to 5 excess atmospheres, sealing times of 5 to 3 seconds and sealing surfaces having a width of 30 to 50 mm are particularly preferred.

If the surfaces which are to be sealed together are not easily placed together with their edges in parallel planes, the piece of coupling foil may be point sealed to the two tubular end pieces to fix its position before it is surface sealed to them.

The process according to the invention may be carried out particularly advantageously by means of a corresponding apparatus which will be described below. The coupled tubular casing obtained in this way according to the invention can be used as packaging material for example as described in German Offenlegungsschrift No. 2,721,392, without having first to be shirred, by the usual commercial shirring process using shirring devices according to German Pat. No. 1,253,093. However, because of the excellent stability of the coupling, tubular casings which have been coupled according to the invention are particularly suitable for the usual shirring process which may be carried out on them before they are subdivided and sealed in the usual manner. The coupled tubular casings according to the invention may also be used for the production of empty and/or filled tube chains, as described, for example, in German Offenlegungsschrift No. 2,732,919. The stability of the coupled tubular casings according to the invention also makes it possible for them to be tied off for example with ligatures which, although they may place some strain on the casing, provide extra protection for the material inside the casing, as described, for example, in German Pat. No. 2,346,134 or in German Offenlegungsschrift No. 2,505,672. Because of their stability, the coupled tubular casings according to the invention can even withstand internal pressures such as those to which they may be subjected in the manufacture of dummy sausages as described in German Offenlegungsschrift No. 2,727,271. Materials other than foodstuffs, for example, corrosive fillings used for technical purposes, can also be packaged in these coupled tubular casings without causing any damage. The various subsequent processes to which tubular casings may be subjected, depending on the material of which they are made, for example the formation of so-called gut rings, as described inter alia in German Auslegeschrift No. 2,322,220, can also be carried out satisfactorily with the coupled tubular casings according to the invention.

EXAMPLE 1

A coupling foil was produced by first pretreating a 15μ thick commercial biaxially stretched polyamide foil, as described for example in German Offenlegungsschrift No. 1,816,509 or German Offenlegungsschrift No. 1,905,539, by corona discharge. Such a corona discharge treatment may be carried out with the apparatus described, for example, in German Pat. No. 1,183,232, German Offenlegungsschrift No. 1,615,515 or German Gebrauchsmuster No. 1,972,580. A bonding agent of the type Adcote 31 A 37 ® was then applied to this electrically pretreated, biaxially stretched foil in a quantity of 1.5 g/m$^2$ in a conventional lacquering machine manufactured by Jagenberg of Dusseldorf, and the same machine was used to apply the top coat consisting of an aqueous polyvinylidene chloride copolymer dispersion of type Ae 17 ® (Wolff Walsrode AG) prepared according to German Pat. No. 2,034,257, and the coat was dried to form a sealing lacquer weighing 20 g/m$^2$.

The coupling foil obtained in this manner had a total thickness of 30μ. It was cut up into separate oblique cut coupling pieces at an angle of 45° and a width of 36 mm (distance between edges of parallelogram).

At the same time, two ends of a tubular casing which were to be joined together, which casing was made of fibre reinforced regenerated cellulose coated on the inside with a lacquer containing PVDC as described, for example, in German Auslegeschrift No. 1,302,384 and had an internal diameter when round of 60 mm and a wall thickness of 100μ was placed flat and the flattened tube ends were also cut at an angle of 45°. The pieces cut out of the coupling foil, which were parallelogram mirror images based on the diagonal of the 45° cut of the tubular casing and measured 36×94.2 mm were then placed in registration on top of each other with their supporting foils in contact, half of the foil was inserted in one of the two tubular end pieces which were to be joined and the other half was inserted in the other end piece and a pressure of 4 excess atmospheres was applied for 4 seconds at 170° C., using a sealing apparatus based on the prototype PF 250 manufactured by Joisten and Kettenbaum but converted to the type of apparatus described later and shown in the accompanying drawing, to form a sealing surface of 19 cm². A tubular casing having a plurality of couplings according to the invention at intervals of 1.50 m was produced in this manner. The tubular casing, coupled in several places, was shirred in the usual manner which was then washed in water at 35° C. for 15 minutes.

The washed tubular casing which had been coupled according to the invention was then filled with pasty material in a commercial FCA filling machine under the usual operating conditions. In this process, a piece of tubular casing 25 cm in length was in each case pulled over the filling horn which had a diameter of 28 mm, and, after the casing had been closed at one end, the material with which it was to be filled was introduced from this filling horn with the screw of the filling system rotating at 235 revs/min. During this process, the tubular casing was pushed through the "gut brake" where it was subjected to a load, measured by spring balances, of 7.5 kp static and 9 kp dynamic. The filling of tubular casings tied off at one end through a filling horn revolver, using automatic clips and a gut brake has been disclosed, in German Offenlegungsschrift No. 2,721,392. In contrast to the couplings of tubular casings hitherto known, the coupling according to the invention was able to withstand the stress in the gut brake without any trouble. The coupling according to the invention also withstood the subsequent boiling and cooking process, which was carried out for one hour in a steam bath at 80° C. Even the following chilling in cold water and drying in air, which makes considerable demands on the flexibility of the tubular casing and its ability to withstand the action of the filling, had no adverse effect on the coupling seam. Since, in addition, no constriction is formed at the coupling seam, the calibre of the casing is maintained very accurately. Further details concerning the behaviour of the coupling according to the invention under the stresses mentioned above may be found in the Tables which follow.

EXAMPLE 2

Formation and use of the coupled tubular casing according to the invention were the same as in Example 1 except that instead of using a coupling foil which could be sealed on only one side, a duplofoil capable of being sealed on both sides was used. All other data were the same as in Example 1 but the process according to the invention could now be even further simplified since the tendency to roll up, which is occasionally found in coupling foils which can be sealed on only one side, is substantially eliminated in duplofoils, so that the completely flat positioning of such foils makes them easier to use for the purpose of the invention.

The following Table shows for comparison a sample A which is a conventional tubular casing produced according to German Auslegeschrift No. 1,302,384 and a sample B which is a tubular casing coupled according to the invention. The comparison is based on the parameters of rigidity and elastic modulus which are important for the subsequent processing of the type mentioned above.

The rigidity is expressed in milli-Newton per mm S[mN/mm].

The modulus of elasticity is expressed in kilo-Newton per mm²: E[kN/mn²] and is determined from the flexure. Both the rigidity and elastic modulus are measured on a dry sample and a washed sample.

Both the rigidity (A dry, B wet) and the modulus of elasticity (A dry B wet) are given in each case in terms of their average value ($\bar{x}$) and their standard deviation (s).

The values for rigidity S and bending in terms of the modulus of elasticity E are compared in the same Table, which shows the values for the usual commercial tubular casing without coupling set against the values obtained for the tubular casing according to the invention. At the end of the Table, results obtained for the dry sample are compared with the results obtained for the wet sample, i.e. the results of rigidity and modulus of elasticity measured both on the ordinary commercial tubular casing without coupling and on the coupled tubular casing according to the invention.

The Table now follows:

|  | Sample A: Tubular casing according to German Auslegeschrift No. 1,302,384 without coupling | Sample B: Tubular casing according to German Auslegeschrift No. 1,302,384 coupled according to the invention |
| --- | --- | --- |
| Rigidity dry Average value from 10 | 43.3 | 161 |
| Rigidity dry Standard deviation S | 13.2 | 14 |
| Rigidity S wet Average value | 17.3 | 47 |
| Rigidity S wet Standard deviation | 2.8 | 6.7 |
| E-modulus flexure Dry average value | 0.84 | 1.267 |
| E-modulus dry Standard deviation | 0.25 | 0.109 |
| E-modulus wet Average value | 0.205 | 0.255 |
| E-modulus wet Standard deviation | 0.033 | 0.063 |

It is obvious from the above Table that the coupled tubular foil according to the invention produced as described in Example 1 above has relatively good values even when compared with the same tubular foil without couplings. The rigidity of the dry, coupled foil increases by only 3.7 times and in the wet foil it is only 2.7 times that of the "uncoupled normal foil". Such advantageous values could not be obtained in comparison experiments carried out on a coupling foil produced according to the state of the art cited above. A tubular casing coupled according to the known art shows an increase in its rigidity in the dry state of 9.6 times compared with the rigidity of a comparison foil not fitted with couplings, and even in the wet state its rigidity after washing is still 9 times that of a foil without couplings. This is a very considerable and moreover unexpected and surprising technical advance.

The superiority of the tubular casing coupled according to the invention compared with similar tubular casings fitted with ordinary commercial couplings is also seen in comparative filling tests carried out on apparatus according to German Offenlegungsschrift No. 2,721,392. Whereas of six commercial coupled tubular casings, five tore in the gut brake, all of the six tubular casings coupled according to the invention remained intact under the same conditions in the gut brake.

BRIEF DESCRIPTION OF THE DRAWINGS

Novel features and advantages of the present invention will become apparent to one skilled in the art from a reading of the following description in conjunction with the accoampanying drawings wherein similar reference characters refer to similar parts and in which.

Figure 1:
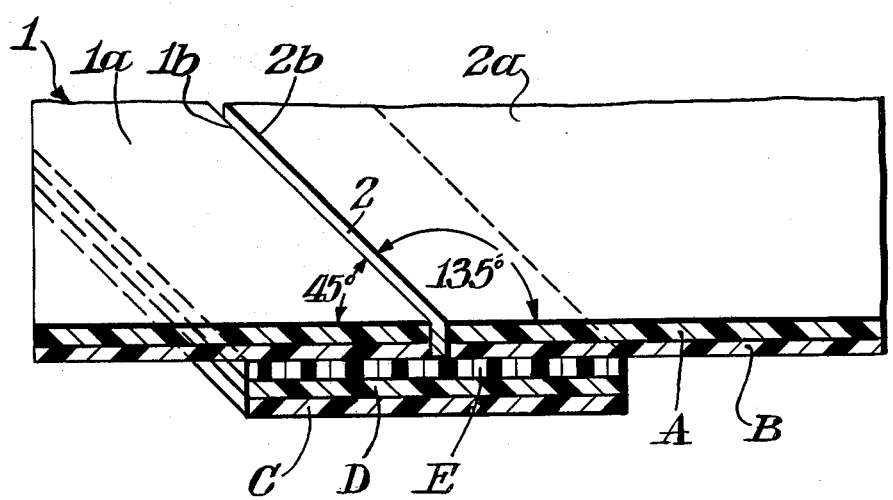
FIG. 1 is a fragmental perspective view in cross-section illustrating the joined tubular casing of this invention.
Figure 1A:
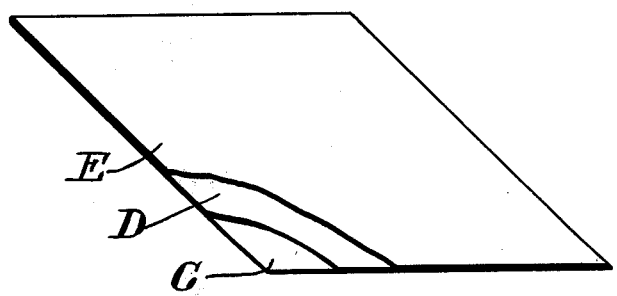
FIG. 1A is a top plan view of the coupling foil in the form of a parallelogram, according to the present invention.
Figure 2:
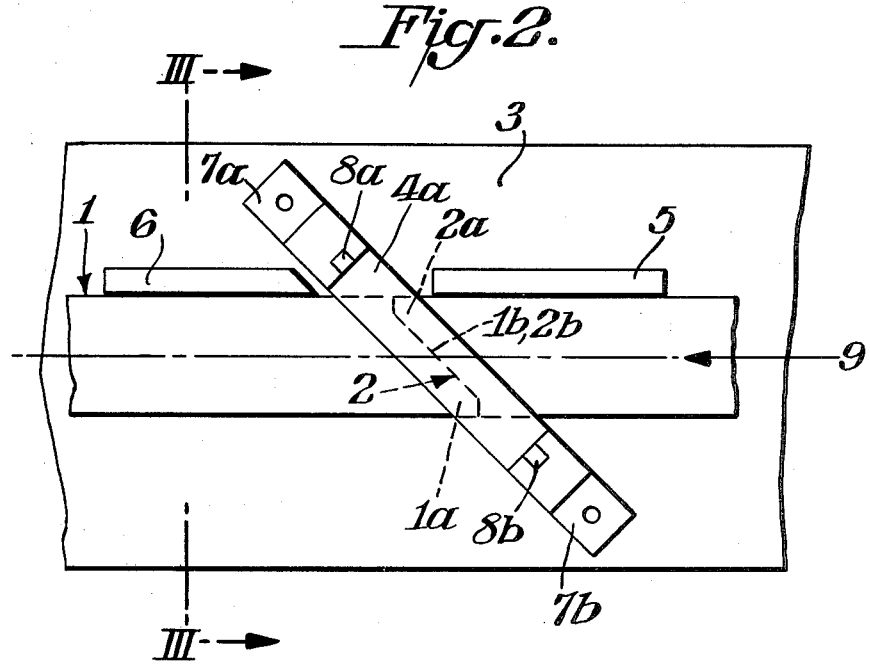
FIG. 2 is a top plan view of the sealing apparatus for producing the tubular casing joint in FIG. 1.
Figure 3:
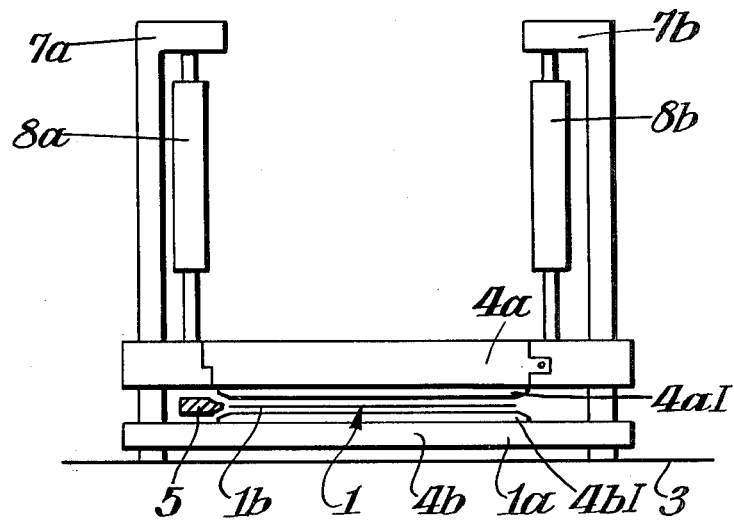
FIG. 3 is a cross-sectional end elevation view taken through FIG. 3 along lines III—III.
Figure 4:
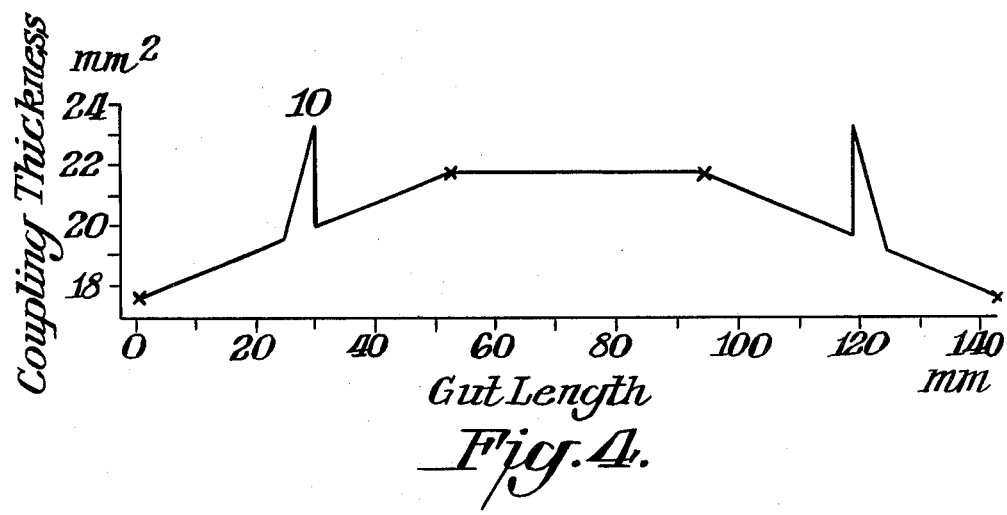
FIG. 4 is a stress graph for the tubular casing of this invention showing its thickness profile wherein the thickness of the coupling is compared against the gut length.

Since the coupling zone extends at an oblique angle to the axis coinciding with the direction of transport of the tubular casing, as shown in FIGS. 1-3 the stress on the casing as it travels through the gut brake increases only gradually according to a very flat curve corresponding to the increase in the profile thickness. The sample sketched here in fact produced the curve shown in FIG. 4 in a test carried out to determine its thickness profile. According to FIG. 4 wherein the thickness of the coupling is platted against the gut length (abszisse).

A sketch of this thickness profile of the coupled tubular casing according to the invention shows that the increase in thickness from 18 mm$^2$ to 21.5 mm$^2$ is distributed over a length of casing of 53 mm. The forces of tension acting on the casing inside the gut brake are therefore much less harmful to the casing than those produced on known art coupling sleeves which extend transversely to the envisaged axis of the casing and moreover are situated on the outside of the casing. This is illustrated by FIG. 5.

Figure 5:
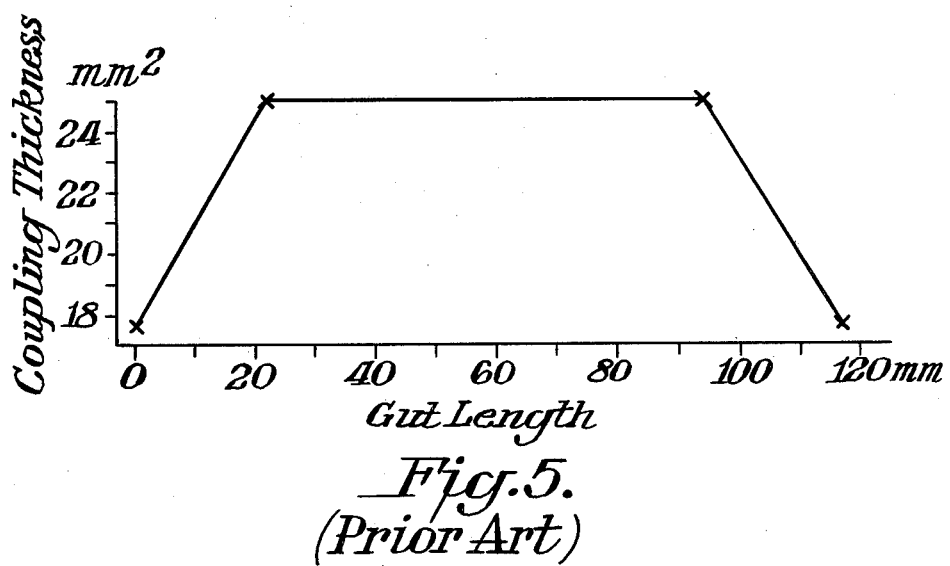
FIG. 5 is a Prior Art stress graph for a conventional tubular casing showing its thickness profile wherein the thickness of the coupling is compared against the gut length.

The considerable increase in the cross-sectional surface area shown in FIG. 5 takes place over a very short length of tubular casing, namely only 23 mm. The sudden increase in the forces of resistance acting on the coupled casing in the gut brake almost invariably causes tearing in the region of the coupling and hence interruption of the filling operation when conventionally coupled tubular casings are used.

FIG. 1 is a schematic sketch of a portion of the tubular casing according to the invention. The casing 1 is composed of the coupled end pieces 1a and 2a. They are severed by an oblique cut 2 made at an angle of 45° so that the cut ends are parallel to each other and placed end to end, and they are securely joined together by the coupling sleeve arranged on the internal surface of the casing. The reference A represents the layer of fibre reinforced regenerated cellulose which constitutes the outer layer of the tubular casing, B represents the inner layer, containing polyvinylidene chloride, C represents the layer of supporting foil of the coupling sleeve biaxially stretched and made of commercial polyamide, D represents the anchoring layer between the supporting foil and the coating foil of the coupling sleeve material, and E represents the PVDC-containing outer layer of coupling sleeve, which is sealed against the PVDC internal layer of the tubular casing.

The process according to the invention may advantageously be carried out with an apparatus as illustrated in FIGS. 2 and 3.

FIG. 2 is a top plan view of the sealing apparatus which is set obliquely according to the invention, and FIG. 3 is a section through FIG. 2 taken on the line III/III.

The reference numerals in the figures have the following means:

1; tubular casing;
1a; 2a: Overlapping end pieces of casing 1 and 2;
1b; 2b: Cut edges of pieces 1 and 2;
3: Workplate
4a; 4b: Sealing jaws, of which 4a can be swung open;
4aI; 4bII: Smooth, exchangeable bars within the sealing jaws 4a, 4b;
5: Adjustable stop bar for supporting tubes;
6: Fixed stop bar for supporting tubes;
7a; 7b: Stand
8a; 8b: Hydraulic pressure device for sealing jaws
9: Direction of travel of the tubular casing which is to be coupled.

The smooth sealing jaws 4a-4b shown in the FIGS. 2 and 3 are 20 cm in length and make it possible for diagonal cuts to be made at an angle of 45° up to a tube calibre of 75. The sealing jaws 4a-4b are heated on both sides. The sealing apparatus can be adjusted to a pressure of up to 5 kp per cm$^2$, depending on the requirement. The sealing temperature can be controlled by a fine adjustment at 100° to 200° C. The sealing time can also be regulated up to 10 seconds. By means of the sealing apparatus described above, the process according to the invention can be carried out most simply and rapidly in the manner described above.

As far as can be assessed at present, the best tubular casings coupled according to the invention were obtained when using pieces of coupling foils in which the supporting biaxially stretched foils were made of polyamide with a tensile strength of 20 kg/mm$^2$. The very great strength of the seal obtained with the sealing layers, especially if they were prepared from the products according to German Pat. No. 2,034,257 combined with the oblique setting of the coupling according to the invention now for the first time makes it possible for coupled tubular casings to withstand considerable stresses, and in particular when the casings are used for sausages it makes it possible for these to be filled, heated, boiled, chilled and dried without any technical faults occurring to interfere with the continuous process.

An optimum seal at the coupling of the tubular casing is obtained when the internal sleeve of foil is arranged to overlap itself, and when a single layered smooth lacquer adhesive is used as described above, a particularly firm bond is obtained in the overlapping zone. Although the width at this overlapping zone may vary since fluctuations in the calibre or diameter of the tubular casing are unavoidable, the imperviousness of the casing in the region of the coupling is not affected by this if the optimum overlapping width is carefully chosen.

We claim:

1. A flexible shirrable coupled tubular casing for foodstuffs having a plurality of couplings the coupling seams of which are formed by adjacent ends of tubular casing portions to be coupled and a multilayered sealable foil, the adjacent ends of the tubular casing portions to be coupled each having a continuous circumferential edge portion which substantially lies in a plane extending at an oblique angle of 10° to 80° to the longitudinal axis of the tubular casing, and the foil placed in sealing engagement with and partially inside each of the adjacent ends of the tubular casing portions to be coupled and also extending at an oblique angle of 10° to 80° to the longitudinal axis of the tubular casing.

2. A casing as claimed in claim 1, in which the multilayered foil comprises at least one supporting layer and at least one sealing layer.

3. A casing as claimed in claim 2, in which the supporting layer of the multilayered foil comprises 6-polyamide; 6,6-polyamide; 6,11-polyamide; 11-polyamide; 12-polyamide or a copolyamide thereof, polyethylene terephthalate, polycarbonate, polypropylene or regenerated cellulose with or without fibre reinforcement.

4. A casing as claimed in claim 2, in which the sealing layer comprises polyvinylidene chloride, polyvinylidene fluoride or a copolymer thereof, nitrocellulose or polyethylene.

5. A casing as claimed in claim 1, in which the multilayered foil includes an adhesifying layer between the supporting layer and the sealing layer.

6. A casing as claimed in claim 5, in which the adhesifying layer comprises a carboxylic acid amide-N-methylol derivative, a polyacrylic compound, a polyethyleneimine condensate, a melamine-formaldehyde condensate or a urea-formaldehyde condensate.

7. A casing as claimed in claim 2, in which the sealing layer of the multilayered foil is a one-coat lacquer.

8. A casing as claimed in claim 1, in which the coupling seam formed by the abutting edges of the adjacent ends of the tubular casing portions to be coupled extend at an oblique angle of 30° to 60° to the longitudinal axis of the tubular casing.

9. A casing as claimed in claim 8, in which the oblique angle is 40° to 50°.

10. A casing as claimed in claim 9, in which the oblique angle is 45°.

11. A casing as claimed in claim 1, in which the multilayered foil has approximately the form of a parallelogram, in which a pair of opposite sides form an angle equal to the oblique angle of the coupling seam and the other pair of opposite sides form an angle supplementary to the oblique angle of the coupling seam.

* * * * *